United States Patent

Hogan et al.

[11] Patent Number: 5,245,494
[45] Date of Patent: Sep. 14, 1993

[54] WRITE-READ MAGNETIC RECORDING HEAD

[76] Inventors: John W. Hogan, 4901 Glenwood Ave., Minneapolis, Minn. 55422; Rolf W. Hogan, 11265 Kentucky Ave. N., Champlin, Minn. 55316

[21] Appl. No.: 729,550

[22] Filed: Jul. 15, 1991

[51] Int. Cl.$^5$ .......................... G11B 5/10; G11B 5/265
[52] U.S. Cl. .................... 360/128; 360/121; 360/122; 360/124
[58] Field of Search ............... 360/121, 122, 124, 128

[56] References Cited

U.S. PATENT DOCUMENTS

| | | | |
|---|---|---|---|
| 3,591,733 | 7/1971 | Pflughaupt | 179/100.2 |
| 3,683,515 | 8/1972 | Kosaka | 35/35 C |
| 3,781,834 | 12/1973 | Van Ginkel et al. | 340/174.1 F |
| 3,789,156 | 1/1974 | Bessette | 179/100.2 C |
| 3,797,031 | 3/1974 | Hashimoto | 360/121 |
| 3,806,902 | 4/1974 | Drees et al. | 360/129 |
| 3,882,544 | 5/1975 | Hughes | 360/118 |
| 3,959,824 | 5/1976 | Ohi et al. | 360/124 |
| 3,969,771 | 7/1976 | Suzuki et al. | 360/121 |
| 4,008,493 | 2/1977 | Pizzuto | 360/123 |
| 4,072,994 | 2/1978 | Takashima | 360/124 |
| 4,170,033 | 10/1979 | Ridgway et al. | 360/121 |
| 4,245,268 | 1/1981 | Toshimitsu | 360/124 |
| 4,291,352 | 9/1981 | Gooch | 360/121 |
| 4,331,992 | 5/1982 | Klein et al. | 360/124 |
| 4,369,476 | 1/1983 | Karsh | 360/123 |
| 4,758,917 | 7/1988 | Gooch | 360/121 |
| 4,787,002 | 11/1988 | Isozaki | 360/118 |
| 4,819,107 | 4/1989 | Bolt | 360/121 |
| 4,827,360 | 5/1989 | Kawasaki et al. | 360/124 X |
| 4,954,921 | 9/1990 | Bolt | 360/121 |
| 4,965,681 | 10/1990 | Takimoto | 360/124 X |

*Primary Examiner*—John H. Wolff
*Attorney, Agent, or Firm*—Herman H. Bains

[57] ABSTRACT

A write-read magnetic head for write-read digital recording machines includes a write magnetic head and a read magnetic head disposed in closely spaced apart relation. Each head includes a shield formed of a ferrous containing material having an opening therein in which the primary (write or read) gap is positioned. Each head includes a magnetic core comprised of a C-shaped core element and on I-shaped core element defining the primary (write) gap. A secondary gap is defined between the I-shaped core element and adjacent wall edge downstream of the write gap. When the recording head is energized, the shields and the secondary flux reduces flux leakages towards the read gap to permit effective reading while writing.

4 Claims, 1 Drawing Sheet

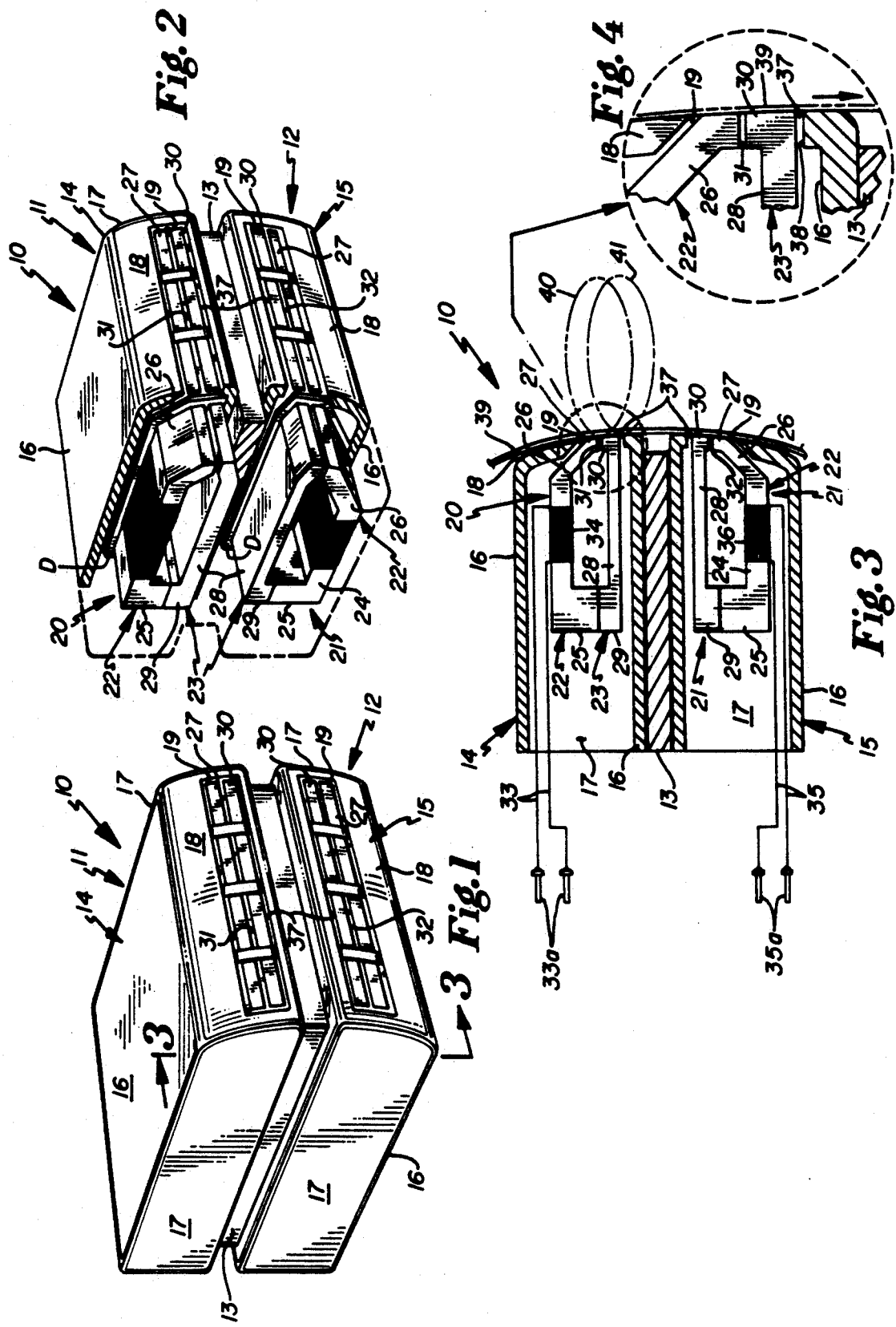

WRITE-READ MAGNETIC RECORDING HEAD

FIELD OF THE INVENTION

This invention relates to a Magnetic head and more particularly to a write-read magnetic head.

BACKGROUND OF THE INVENTION

Write-read magnetic heads are available and are typically used to write and read information on a magnetic stripe forming a part of a card or magnetic tape. For example, cards or documents prepared in this manner may be used in systems where a limited amount of information is written (encoded) such as a standard airline ticketing system. In digital recording devices, the magnetic write-read heads are disposed in side-by-side relation so that the write gap and the read gap are spaced apart a short distance.

These conventional prior art write-read heads, can read after write but cannot be read while writing encoding. Write-read recording heads of this type generate magnetic flux at the write gap which inundates the gap at the read head and prevents clear written (recorded) signals from being received by the read head. Shielding is provided in these conventional write-read heads and helps reduce magnetic flux leaking towards the read head. However, shielding alone is not sufficient to permit efficient reading simultaneously with writing.

SUMMARY OF THE INVENTION

It is an object of this invention to provide a write-read head which is arranged and constructed to permit efficient reading simultaneously with writing.

More specifically, it is an object of invention to provide a write-read magnetic head in which the write magnetic core is configured to cooperate with the associated shield to provide a secondary gap at the write head which produces counteracting flux to reduce magnetic flux leak leakage from the write gap towards the read head and thereby permit reading simultaneously with writing.

In carrying out the invention, each magnetic core, comprised of a C-shaped core element and an I-shaped core element, is positioned within a shield to dispose the I-shaped core element in close proximal relation to a shield wall. The I-shaped core element cooperates with the adjacent shield wall to define a secondary gap located downstream of the write gap. When the head is energized, the secondary gap produces magnetic flux opposing the magnetic flux generated by the write gap that leaks towards the read gap. The opposing magnetic flux reduces this flux leakage and prevents inundation of the read gap by the write gap flux. This arrangement permits efficient reading simultaneously with writing.

FIGURES OF THE DRAWING

FIG. 1 is a perspective view of the write-read magnetic head.

FIG. 2 is a perspective view similar to FIG. 1 but with certain parts thereof broken away for clarity.

FIG. 3 is a diagrammatic cross-sectional view of the write-read magnetic head illustrating the component parts thereof and illustrating the electromagnetic dynamics thereof.

FIG. 4 is an enlarged fragmentary view of a portion of FIG. 3.

DESCRIPTION OF THE PREFERRED EMBODIMENT

Referring now to the drawings it will be seen that one embodiment of the novel magnetic write-read head, designated generally by the reference numeral 10, is thereshown. The magnetic write-read head 10 includes a magnetic write head 11 and magnetic read head 12 having a non-magnetic spacer 13 positioned therebetween. The write-read head 10 is adapted to be incorporated in a digital recording machine of conventional construction which is used to record information on a magnetic stripe or tape. Each write head and read head pair are arranged in closely spaced-apart parallel relationship, i.e., upper and lower relationship or side-by-side relationship. The magnetic write head 11 is provided with a write shield 14 and the magnetic read head 12 is provided with a read shield 15.

The shields are of identical construction and are formed of a ferrous containing material. Each shield includes opposed side walls 16, opposed end walls 17 and a front wall 18. The front wall 18 of each shield has an elongate opening 19 therein which extends throughout a major portion of the length of the front wall and terminates closely adjacent the end walls 16. Referring now to FIG. 2, it will be noted that the opening 19 is located closer to one of the side walls 16 than the other side wall. It will be noted that the write and read heads are positioned in upper-lower parallel relationship as illustrated in the drawings.

The write shield 14 has a plurality of electromagnetic write cores 20 therein while the read shield 15 has a plurality of electromagnetic read cores 21 therein which are identical to the write cores 20. Each electromagnetic core (20, 21) in each shield is separated by a non-magnetic spacer element D. Each electromagnetic core 20, 21 includes an elongate C-shaped core element 22 and an elongate I-shaped core element 23. The C-shaped core element 22 for each electromagnetic core includes a straight central portion 24 having a rear end portion 25 integral therewith and extending at substantially right angles therefrom. The central portion 24 is also integral with a forwardly projecting angle portion 26 which terminates in a terminal portion 27.

The I-shaped core element for each electromagnetic core includes a straight central portion 28 having a rear end portion 29 integral therewith and extending in substantially right angular relation therewith. The rear end portion 29 is secured to the rear end portion 25 of the C-shaped core element in abutting relation therewith. Each I-shaped core in 23 also includes a front terminal portion 30 which is disposed in closely spaced proximal relation with the terminal portion 27 of the C-shaped core element to define a write gap 31 in the write head and to define a read gap 32 in the read head. It will be noted that the write gap and the read gap are each disposed in the elongate opening 19 formed in the front wall of the associated shield. The read gap 32 is positioned downstream of the write gap 31 with respect to the direction of travel of the magnetic stripe 39.

An elongate electrical conductor 33 has coils 34 wound about the straight central portion 24 of the C-shaped core element of the write head 11 and an elongate electrical conductor 35 has coils 36 wound about the straight central portion of the C-shaped core element of the read head 12. It will be noted that the conductor 33 is connected in a conventional manner to a pair of terminal pins 33a while the conductor 35 is connected to a pair of terminal pins 35a. Since each head (write and read) has four electromagnetic cores, there will be four pairs of terminal pins for each head. Each core and conductor windings define a write core in the write head and a read core in the read head. The conductor 33 of the write head is connected to a source of digital pulse current and when energized produces digital magnetic flux, designated by the reference numeral 40, at the primary or write gap 31 during writing or recording on the magnetic stripe 39 as it is moved past the write gap. This magnetic flux 40 in conventional write-read machines leaks towards and inundates the read gap 32 and prevents reading simultaneous with writing.

Referring again to FIG. 2, it will be seen that the I-shaped core element in each magnetic head is positioned closely adjacent and in substantially parallel relation with one of the side walls 16 to define a secondary gap or magnetic field between the I-shaped core element and the adjacent edge 38 of the side wall. The secondary gap 37 in the write head is positioned downstream of the write gap 31 and upstream of the read gap 32 with respect to the direction of travel of the magnetic stripe 39. It is pointed out that the write shield and read shield are both formed of the same ferrous containing material as the electromagnetic cores. Therefore when the electromagnetic write core 20 is energized, the side wall 16 closest adjacent the I-shaped core element 23 will be magnetized and will have a polarity opposite that of the polarity of the I-shaped core element at the gap 37. Therefore a secondary flux 41 will emanate from the secondary gap magentic field area 37 but will be in a direction counter to the direction of the magnetic flux 40. Although the primary flux 40 is of greater strength than the secondary flux, the secondary flux is sufficient to cancel substantial flux leakage in a downstream direction towards the read gap 32. The secondary flux therefore reduces leakage of the primary flux from inundating the read gap 32 of the read head 15. This arrangement permits (read) magnetic signals to be received from the tape or stripe 39 simultaneously during writing on the stripe or tape 39.

It is pointed out that each read gap is disposed directing in line with a write gap in accordance with conventional practice. The writing from a write gap on a portion of the magnetic stripe passes over its aligned read gap. The spacing between a write gap and its associated read gap is of substantial importance In the embodiment shown, the spacing between a write gap and its associated read gap is within the range of 0.245 inches and 0 24 inches. When all four write coils (core and electrical conductor windings) are engaged at the proper writing level (150% of tape saturation) any read coil will be at least 80 db (decibel) lower than the db at a write coil.

Although the write shield and read shield serve to shield the respective electromagnetic cores against flux leakage during operation of the write-read head 10, the shielding alone is not effective in permitting reading simultaneously with writing. The counter directed flux emanating from the secondary gap or magnetic field 37 opposes the primary flux and reduces the leakage to the read gap. The dual action of both shield and secondary gap or magnetic field effects will greatly reduce flux transfer from write to read gaps.

It will therefore be seen that the particular configuration of the electromagnetic core of the read and write heads, and the inter-relationship of the magnetic core to the opening in the shield to create the secondary gap or magnetic field are features that permit reading simultaneously with writing with the novel write-read recording head.

From the foregoing description it will be seen that we have provided a novel and unique write-read head which permits effective reading simultaneously with writing.

Thus it will be seen that we have provided a novel write-read head which is not only of simple and inexpensive construction, but one which functions in a more efficient manner than any heretofore known comparable recording head.

What is claimed is:

1. A write-read magnetic read device for use in a write-read machine for reading or displaying written information from a magnetic stripe simultaneously during writing of the written information on the magnetic stripe, comprising;

a write head and a read head positioned in closely spaced-apart parallel relation and each head including a shield comprised of opposed side wall portions, opposed end wall portions, and a front wall portion, an elongate opening in the front wall portion of the shield for each head, a pair of electromagnetic cores each positioned in one of the shields, each core including a pair of elongate core elements, each core element of each core having an end thereof positioned in close proximal relation to an end of the other core element to define a write gap in the write head and a read gap in the read head, one of core elements of the write head being disposed in closely spaced-apart relation to a side wall portion of the associated shield and cooperating therewith to define a secondary gap at the opening in the front wall of the write head, each of said heads having an elongate electrical conductor wound about a core element thereof, said conductor for the write head being connected to a source of digital pulse current and when energized, generating digital magnetic flux at the write gap and generating a counteracting magnetic flux at the secondary gap of the write head, said secondary magnetic flux effects cooperating with the write head shield to substantially reduce flux leakage from the primary gap towards the read gap as the magnetic stripe is moved in a downstream direction first past the write gap and then past the read gap to thereby permit effective reading simultaneously with writing of information on the magnet stripe.

2. The write-read magnetic head device as defined in claim 1 wherein one of the core element of each core is of I-shaped configuration and the other core element of each core is of C-shaped configuration.

3. A write-read magnetic head device for use in a write-read machine for reading or displaying written information from a magnetic strip simultaneously during writing of the written information on the magnetic strip, comprising;

a write head and a read head positioned in closely spaced-apart parallel relation, each head including a shield comprised of opposed side walls, opposed end walls, and a front wall, an elongate opening in the front wall of the shield for each head, a pair of electromagnetic cores each positioned in one of the shields, each core including an elongate C-shaped core element and an elongate I-shaped core element, said C-shaped core element having one end thereof secured to one end of the I-shaped core element, the other end of the C-shaped core element being positioned in close proximal relation to the other end of said I-shaped core element to define a write gap in the write head and a read gap in the read head, said I-shaped core element being disposed in closely spaced-apart relation to one of said side walls of the associated shield and cooperating therewith to define a secondary gap at the opening in the front wall of the write head, each of said heads having an elongate electrical conductor wound about the C-shaped core element thereof, said conductor for the write head being connected to a source of digital pulse current and when energized, generating digital magnetic flux at the write gap and generating a counteracting magnetic flux at the secondary gap of the write head, said secondary magnetic flux effects cooperating with the write head shield to substantially reduce flux leakage from the primary gap towards the read gap as the magnetic stripe is moved in a downstream direction first past the write gap and then past the read gap to thereby permit effective reading simultaneously with writing of information on the magnetic stripe.

4. The write-read magnetic head device as defined in claim 3 wherein the I-shaped core element of each magnetic core is disposed substantially parallel with the side walls of a shield.

* * * * *